US011981609B2

(12) United States Patent
Muehlhaeusser et al.

(10) Patent No.: US 11,981,609 B2
(45) Date of Patent: May 14, 2024

(54) RAW MATERIAL FOR PRODUCING A REFRACTORY PRODUCT, A USE OF THIS RAW MATERIAL, AND A REFRACTORY PRODUCT COMPRISING A RAW MATERIAL OF THIS KIND

(71) Applicant: Refractory Intellectual Property GmbH & Co. KG, Vienna (AT)

(72) Inventors: Juergen Muehlhaeusser, Leoben (AT); Raghunath Prasad Rana, Leoben (AT); Gerald Reif, Poelstal (AT); Milos Blajs, Kapfenberg (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 419 days.

(21) Appl. No.: 16/643,750

(22) PCT Filed: Aug. 28, 2018

(86) PCT No.: PCT/EP2018/073073
§ 371 (c)(1),
(2) Date: Mar. 2, 2020

(87) PCT Pub. No.: WO2019/019618
PCT Pub. Date: May 16, 2019

(65) Prior Publication Data
US 2020/0277226 A1    Sep. 3, 2020

(30) Foreign Application Priority Data
Nov. 8, 2017 (EP) .................... 17200525

(51) Int. Cl.
*C04B 7/32* (2006.01)
*C04B 35/101* (2006.01)
*C04B 35/66* (2006.01)
*C04B 38/00* (2006.01)
*C04B 35/10* (2006.01)
*C04B 38/06* (2006.01)
*C04B 111/00* (2006.01)
*C04B 111/40* (2006.01)

(52) U.S. Cl.
CPC ............ *C04B 7/32* (2013.01); *C04B 35/1015* (2013.01); *C04B 35/66* (2013.01); *C04B 38/0058* (2013.01); *C04B 35/10* (2013.01); *C04B 38/0675* (2013.01); *C04B 2111/00431* (2013.01); *C04B 2111/40* (2013.01); *C04B 2201/20* (2013.01); *C04B 2235/3201* (2013.01); *C04B 2235/3206* (2013.01); *C04B 2235/3208* (2013.01); *C04B 2235/321* (2013.01); *C04B 2235/3217* (2013.01); *C04B 2235/77* (2013.01); *C04B 2235/80* (2013.01)

(58) Field of Classification Search
CPC ....... C04B 7/32; C04B 35/1015; C04B 35/66; C04B 38/0058; C04B 35/10; C04B 38/0675; C04B 2111/00431; C04B 2111/40; C04B 2201/20; C04B 2235/3206; C04B 2235/3208; C04B 2235/321; C04B 2235/3217; C04B 2235/77; C04B 2235/80; C04B 2235/3201; C04B 2235/3272; C04B 2235/3418; C04B 2235/5427; C04B 35/634; C04B 35/63416; C04B 35/638; C04B 35/111; C04B 35/62695; C04B 38/0645; C04B 35/622; C04B 35/44; C04B 35/443; C04B 35/101; C04B 38/06
See application file for complete search history.

(56) References Cited

U.S. PATENT DOCUMENTS 5,135,896 A * 8/1992 Vezza ................... C04B 35/111
                                                          501/153

FOREIGN PATENT DOCUMENTS

| CN | 101663251 A |   | 3/2010 |
| CN | 102161591 A | * | 8/2011 |
| CN | 102161591 A |   | 8/2011 |
| CN | 102161591 B |   | 3/2013 |
| CN | 104119089 A |   | 10/2014 |
| JP | 2008013430 A | * | 1/2008 |
| JP | 4847400 B2 |   | 12/2011 |
| WO | 2019091618 A1 |   | 5/2019 |

OTHER PUBLICATIONS

Xu L., Jin L., Yin X., Chen M. (2015) Densification and Mechanical Properties of Reaction Sintered Al2O3—MgO—CaO Refractory. In: Carpenter J.S. et al. (eds) Characterization of Minerals, Metals, and Materials 2015. Springer, Cham. Doi: 10.1007/978-3-319-48191-3_41 (Year: 2015).*
JP-2008013430-A, machine translation (Year: 2008).*
ReStaR. Bulk density/open porosity (2013) [retrieved at Jul. 1, 2022 from <URL:https://www.restar.eu/home/testing-standards-for-refractories/bulk-density-open-porosity/>]. (Year: 2013).*
De Aza, A.H., Iglesias, J.E., Pena, P. and De Aza, S. (2000), Ternary System Al2O3—MgO—CaO: Part II, Phase Relationships in the Subsystem Al2O3—MgAl2O4—CaAl4O7. Journal of the American Ceramic Society, 83: 919-927. https://doi.org/10.1111/j.1151-2916.2000.tb01295.x (Year: 2000).*
CN-102161591-A, machine translation (Year: 2011).*
CN-102161591-A, machine translation (Year: 2014).*
De Aza et al. (Ternary System Al2O3—MgO—CaO: Part II, Phase Relationships in the Subsystem Al2O3—MgAl2O4—CaAl4O7, J. Am. Ceram. Soc., 83 [4] 919-927 (2000) (Year: 2000).*

(Continued)

*Primary Examiner* — Anthony J Green
*Assistant Examiner* — Marites A Guino-O Uzzle
(74) *Attorney, Agent, or Firm* — Calfee, Halter & Griswold LLP

(57) ABSTRACT

The invention relates to a raw material for producing a refractory product, a use of this raw material, and a refractory product comprising a raw material of this kind.

15 Claims, No Drawings

(56) References Cited

OTHER PUBLICATIONS

Xu, et al., "DensificationandMechanicalPropertiesofReactionSinteredAl2O3—MgO—CaORefractory", InThe inerals, Metals &MaterialsSociety, Jan. 1, 2015, pp. 337-343. (Year: 2015).*
Xu, et al., "EffectsofCaOcontentonsinteringandlightweightofAl2O3—MgO—Ca0Orefractories", InMaterialsesearchInnovations, vol. 19,2015, pp. 1-7. (Year: 2015).*
"International Search Report for PCT Patent Application No. PCT/EP2018/073073", Mailed Date: Oct. 1, 2018, 4 Pages.
"Written Opinion of the International Searching Authority for PCT Patent Application No. PCT/EP2018/073073", Mailed Date: Oct. 1, 2018, 7 Pages.
Wen, et al., "High-Strength, Lightweight Spinel Refractories", In American Ceramic Society Bulletin, vol. 84, Apr. 2005, pp. 9201-9203.
Xu, et al., "Densification and Mechanical Properties of Reaction Sintered Al2O3—MgO—CaO Refractory", In The Minerals, Metals & Materials Society, Jan. 1, 2015, pp. 337-343.
Xu, et al., "Effects of CaO content on sintering and lightweight of Al2O3—MgO—CaO refractories", In Materials Research Innovations, vol. 19, 2015, pp. 1-7.
"Office Action for Chinese Patent Application No. 201880058365.6", Mailed Date: Aug. 25, 2021, 25 Pages.
De Aza, et al., "Ternary System Al2O3—MgO—CaO: Part II, Phase Relationships in the Subsystem Al2O3—MgAl2O4—CaAl4O7", In Journal of the American Ceramic Society, vol. 83, Issue 4, Apr. 2000, pp. 919-927.
"First Examination Report for Indian Patent Application No. 202047010084", Mailed Date: Mar. 11, 2022, 7 pages.
"Office Action for Malaysian Patent Application No. PI2020001251", Mailed Date: Sep. 27, 2023, 4 pages.
"Office Action for Canadian Patent Application No. 3,072,124", Mailed Date: Feb. 5, 2024, 4 pages.

* cited by examiner

RAW MATERIAL FOR PRODUCING A REFRACTORY PRODUCT, A USE OF THIS RAW MATERIAL, AND A REFRACTORY PRODUCT COMPRISING A RAW MATERIAL OF THIS KIND

The invention relates to a raw material for producing a refractory product, a use of this raw material, and a refractory product comprising a raw material of this kind.

Refractory products can be produced from raw materials. Raw materials of this kind can be present in nature in the form of natural raw materials (for example magnesite) or can be produced in the form of synthetic raw materials by a technical process (for example sintered magnesia). Here, the raw materials for producing the refractory product are provided mixed in the form of a batch and are then further processed to form a refractory product. For the production of sintered refractory products, the raw materials of the batch are exposed to temperature in such a way that the raw materials of the batch are sintered together and then form a sintered refractory product. In order to produce a refractory product in the form of a refractory concrete, a cement and at least one refractory raw material are mixed together, whereupon the cement is left to set so as to obtain a refractory concrete after the setting process.

The term "refractory product" in the sense of the invention in particular designates products having a use temperature of more than 600° C. and preferably refractory materials in accordance with DIN 51060:2000-06, i.e. materials having a pyrometric cone equivalent >PCE 17. The pyrometric cone equivalent can be determined in particular in accordance with DIN EN 993-12:1997-6.

For insulation purposes at high temperatures, refractory products having insulating properties are required. Refractory products of this kind having insulating properties are produced with use of raw materials having a high porosity and an accompanying high insulating value. All materials of this kind having a high porosity are also referred to as lightweight raw materials.

A typical lightweight raw material is for example lightweight chamotte. Lightweight chamotte is a highly porous raw material based on chamotte (that is to say a raw material based on the oxides $Al_2O_3$ and $SiO_2$). However, the use temperatures of refractory products produced with use of lightweight chamotte are limited. Generally, the use of temperatures of refractory products produced with use of lightweight chamotte are less than 1,400° C.

An alternative lightweight raw material is hollow sphere corundum. This lightweight raw material consists largely of corundum and has a high fire resistance, such that the use temperatures of a refractory product produced using hollow sphere corundum are practically unlimited due to the presence of hollow sphere corundum. However, hollow sphere corundum is produced by the blowing of a corundum melt and is therefore technically very complex, such that the production of refractory products using hollow sphere corundum is often left out of consideration or is of no interest economically.

The object of the present invention is to provide a raw material by means of which a refractory product of low density can be produced. In particular, the invention is based in this regard on the object of providing a raw material in the form of a lightweight raw material by means of which a refractory product of low density can be produced.

A further object of the invention lies in providing a raw material of this kind by means of which a refractory product having a high insulating value can be produced.

A further object of the invention lies in providing a raw material of this kind which allows the production of a refractory product having, at the same time, high use temperatures, in particular also having use temperatures of more than 1,600° C. or also more than 1,650° C. In particular, the object of the invention is to provide a raw material of this kind which does not form any melt phases at 1,600° C. or also at 1,650° C.

A further object of the invention lies in providing a raw material of this kind which from a technical viewpoint can be easily produced, in particular from a technical viewpoint more easily than the production of hollow sphere corundum.

A further object of the invention lies in providing a refractory product comprising a raw material of this kind.

In order to achieve these objects, in accordance with the invention a raw material for producing a refractory product is provided, said raw material comprising the following features:

the raw material has a chemical composition according to which the following oxides are present in the following proportions:
$Al_2O_3$: 83 to 93 mass %,
MgO: 2 to 10 mass %,
CaO: 2 to 10 mass %;
the raw material has an open porosity in the range of from 30 to 60 volume %.

It has surprisingly been found in accordance with the invention that the above objects can be achieved by means of a raw material having a chemical composition of this kind and an open porosity.

By means of a raw material of this kind according to the invention, which can also be referred to as a lightweight raw material on account of its high open porosity and its accompanying low density, a refractory product of low density and having a high insulating value can thus be produced. In particular, it has also been found within the scope of the invention that a refractory product produced with use of the raw material according to the invention allows use temperatures of more than 1,600° C., and sometimes also more than 1,650° C. The raw material according to the invention can also be provided in such a way that it does not form any melt phases at 1,600° C. or even at 1,650° C. In particular, the raw material according to the invention however can also be produced with particularly low technical outlay. Furthermore, the raw material according to the invention can also be produced with a low economical outlay, in particular also from favourable raw materials by technically simple methods.

The raw material according to the invention has a chemical composition in accordance with which $Al_2O_3$ is present in a proportion in the range of from 83 to 93 mass %. In accordance with an even more preferred embodiment the raw material has a chemical composition in accordance with which $Al_2O_3$ is present in a proportion in the range of from 85 to 90%.

The raw material according to the invention also has a chemical composition in accordance with which MgO is present in a proportion in the range of from 2 to 10 mass %. In accordance with an even more preferred embodiment the raw material has a chemical composition in accordance with which MgO is present in a proportion in the range of from 4 to 9 mass %.

The raw material according to the invention also has a chemical composition in accordance with which CaO is present in a proportion in the range of from 2 to 10 mass %. In accordance with an even more preferred embodiment the raw material has a chemical composition in accordance with which CaO is present in a proportion in the range of from 5 to 8 mass %.

The values provided here for the mass proportions of oxides in the raw material according to the invention relate in each case to the total mass of the raw material, that is to say to the total mass of the substances according to the chemical composition of the raw material according to the invention.

The chemical composition of the raw material is determined by means of X-ray fluorescence analysis (XRF) in accordance with DIN EN ISO 12677:2013-02.

In accordance with the invention it has been found that the properties of the raw material according to the invention, in particular the high fire resistance thereof, can be compromised if the raw material, besides the oxides $Al_2O_3$, MgO and CaO, also comprises proportions of further substances.

In accordance with a preferred embodiment it is provided in this respect that the raw material according to the invention has a chemical composition in accordance with which the oxides $Al_2O_3$, MgO and CaO are present in a total proportion of at least 98 mass %, even more preferably in a total proportion of at least 99 mass %, in each case in relation to the total mass of the substances of the chemical composition of the raw material according to the invention.

Accordingly, it can be provided that the raw material according to the invention is a chemical composition in accordance with which, besides the oxides $Al_2O_3$, MgO and CaO, further substances are also present in a proportion less than 2 mass %, in particular in a proportion less than 1 mass %.

It has been found in accordance with the invention that, in particular by the presence of the oxides $SiO_2$ and $Fe_2O_3$ in the raw material according to the invention, the properties of the raw material, in particular the refractory properties thereof, can be compromised.

In accordance with one embodiment it is therefore provided that the raw material according to the invention has a chemical composition with a proportion of $SiO_2$ less than 0.5 mass %, even more preferably with a proportion less than 0.3 mass %.

In accordance with one embodiment it is therefore provided that the raw material according to the invention has a chemical composition with a proportion of $Fe_2O_3$ less than 0.5 mass %, even more preferably with a proportion less than 0.3 mass %.

Since the fire resistance of the raw material according to the invention is negatively affected in particular also by the presence of alkali oxides, it is provided in accordance with one embodiment that the raw material according to the invention has a chemical composition with a proportion of $NaO_2$ less than 0.5 mass %, even more preferably less than 0.2 mass %. In accordance with a development of this concept of the invention, it is provided that the raw material according to the invention has a chemical composition with a total proportion of alkali oxides (in particular $Na_2O$, $K_2O$ and $Li_2O$) less than 0.5 mass %, and even more preferably less than 0.2 mass %.

The raw material according to the invention has an open porosity in the range of from 30 to 60 vol. %. Due to a high open porosity of this kind, the raw material according to the invention has only a low thermal conductivity, such that the insulating properties of a refractory product can be improved by the use of the raw material according to the invention for production of the refractory product.

In this regard, it has been found in accordance with the invention that with an open porosity of the raw material according to the invention of less than 30 vol. %, the insulating value of the refractory product is in part only inadequately improved, and with an open porosity of more than 60 vol. % the strength of the refractory product can be compromised. In this regard an open porosity of the raw material according to the invention in the range of from 30 to 60 vol. % has proven to be particularly advantageous. The raw material according to the invention particularly preferably has an open porosity in the range of from 35 to 55 vol. %. The open porosity is determined in accordance with DIN 66133:1993-06.

The raw material according to the invention preferably has a raw density in the range of from 1.60 to 2.50 $g/cm^3$, even more preferably a raw density in the range of from 1.66 to 2.30 $g/cm^3$. The raw density is determined in accordance with DIN EN 993-1:1995-04.

The raw material according to the invention preferably has a bulk weight (or a bulk density) in the range of from 600 to 1,000 g/l. The bulk weight is determined in accordance with DIN EN ISO 60:2000-01.

It has proven to be very advantageous within the scope of the invention if the raw material according to the invention has an extremely small pore size. In particular, it has been found that the raw material according to the invention with a mostly small pore size can have a high open porosity alongside a high strength. It is preferably provided that the raw material according to the invention has a pore size distribution in accordance with which at least 90 vol. % of the pore volume of the open pores is formed from pores with a pore size less than 50 μm.

The pore size distribution is determined by means of mercury intrusion porosimetry in accordance with DIN 66133:1993-06.

The raw material preferably comprises the mineralogical phase $Ca_2Mg_2Al_{28}O_{46}$. This phase is characteristic for the raw material according to the invention and is routinely obtained in the production of the raw material according to the invention, provided this raw material has the chemical composition according to the invention. The phase $Ca_2Mg_2Al_{28}O_{46}$, which can also be written as a chemical formula or in its oxide form as $2CaO.2MgO.14Al_2O_3$, is comprised by the raw material according to the invention preferably in a proportion in the range of from 20 to 50 mass % and particularly preferably in a proportion in the range of from 30 to 50 mass %, in relation to the total mass of the raw material.

The raw material according to the invention preferably comprises the mineralogical phase $CaMg_2Al_{16}O_{27}$. This phase is also characteristic for the raw material according to the invention, wherein the raw material routinely comprises this phase if it has the chemical composition according to the invention. This phase, which can also be written as a chemical formula or in its oxide form as $CaO.2MgO.8Al_2O_3$, is preferably comprised by the raw material according to the invention in a proportion in the range of from 20 to 50 mass %, and particularly preferably in a proportion in the range of from 30 to 50 mass %, in relation to the total mass of the raw material.

The raw material according to the invention can preferably comprise the mineralogical phase $CaAl_4O_7$ (grossite). This phase, which can also be written as a chemical formula or in its oxide form as $CaO.2Al_2O_3$, is preferably comprised by the raw material according to the invention in a proportion in the range of from 1 to 9 mass % and particularly preferably in a proportion in the range of from 3 to 7 mass %, in relation to the total mass of the raw material.

The raw material according to the invention can preferably comprise the mineralogical phase $CaAl_{12}O_{19}$ (hibonite). This phase, which can also be written as a chemical formula or in its oxide form as $CaO.6Al_2O_3$, is preferably comprised by the raw material according to the invention in a proportion in the range of from 1 to 9 mass % and particularly preferably in a proportion in the range of from 3 to 7 mass %, in relation to the total mass of the raw material.

The raw material according to the invention can in particular also comprise the mineralogical phase spinel ($MgAl_2O_4$, $MgO.Al_2O_3$), which is also referred to as "real" spinel or magnesia spinel, in spite of the proportions of $Al_2O_3$ and MgO, merely in a relatively small proportion. It is particularly provided that the raw material according to the invention comprises a spinel in a proportion less than 8 mass %, even more preferably in a proportion less than 5 mass %. However, it can be provided that the raw material comprises the spinel phase in a proportion of at least 1 mass %. The above values in mass % relate in each case to the total mass of the raw material.

In accordance with the invention it has been found that the properties of the raw material according to the invention, in particular its high fire resistance, can be compromised if the raw material, besides the above-mentioned, mineralogical phases $Ca_2Mg_2Al_{28}O_{46}$, $CaMg_2Al_{16}O_{27}$, grossite, hibonite and spinel, also comprises proportions of further phases. In accordance with a preferred embodiment it is therefore provided that the raw material according to the invention comprises a total mass of these mineralogical phases of at least 97 mass %, even more preferably at least 99 mass %, in each case in relation to the total mass of the raw material according to the invention.

It can be provided accordingly that the raw material according to the invention, besides the above-mentioned mineralogical phases $Ca_2Mg_2Al_{28}O_{46}$, $CaMg_2Al_{16}O_{27}$, grossite, hibonite and spinel, also comprises proportions of further phases in a proportion less than 3 mass %, even more preferably in a proportion less than 1 mass %.

The type and proportion of the mineralogical phases in the raw material according to the invention are determined by means of X-ray diffractometry in accordance with DIN EN 13925-1:2003-07.

The invention also relates to the use of the raw material according to the invention disclosed herein for producing a refractory product.

This use is preferably on the proviso that the raw material according to the invention is mixed with further raw materials and is further processed to form a refractory product.

In accordance with one embodiment the raw material is used to produce a sintered refractory product, that is to say a sintered refractory ceramic product. This use of the raw material according to the invention is preferably on the proviso that the raw material is mixed with further raw materials and is then fired to form a sintered refractory product, or is subjected to sintering. After the mixing and before the firing, the mixture formed of the raw material according to the invention with the further raw materials, that is to say the batch created in this regard can be shaped, for example by pressing. In this regard, the batch for example can be pressed to form an unfired shaped body, or what is known as a green body. This green body can then be sintered, as mentioned beforehand.

In accordance with a particularly preferred embodiment the raw material is used to produce a cement-bound refractory product, that is to say a refractory concrete. This use of the raw material according to the invention is preferably on the proviso that the raw material is mixed with a cement and optionally water, and the cement is then left to set. Once the cement has set, a refractory concrete is obtained. The raw material is preferably mixed with a hydraulically setting cement, particularly preferably with a calcium-aluminate cement.

The invention also relates to a refractory product comprising a raw material according to the invention. A refractory product of this kind, as already discussed, is preferably present in the form of a refractory concrete. A refractory concrete of this kind preferably comprises a calcium-aluminate cement and a raw material according to the invention.

A refractory product produced with use of the raw material according to the invention can comprise the raw material according to the invention in a proportion corresponding to the use conditions of the refractory products. With a rising proportion of the raw material according to the invention in the refractory product, the insulating properties of the product also rise. At the same time, with a rising proportion of the raw material according to the invention in the refractory product, the strength thereof, in particular the compressive strength thereof, can also decrease. Within the scope of the invention a proportion of the raw material according to the invention in a refractory product in the range of from 10 to 90 mass %, particularly preferably in the range of from 20 to 80 mass %, in each case in relation to the total mass of the product, has proven to be advantageous, and therefore a product produced with use of the raw material according to the invention can comprise the raw material according to the invention preferably in a proportion of this magnitude.

A refractory product according to the invention of this kind produced with use of the raw material according to the invention can be used in principle as a refractory insulating material for any applications. In particular, the refractory product according to the invention can be used as an un-shaped refractory product, that is to say as what is known as an "insulation mass" or "insulating mass", in particular as refractory concrete, as discussed previously. It has been found in accordance with the invention that the product according to the invention can be used particularly advantageously for refractory, in particular for highly refractory, insulating applications in aggregates for the chemical and petrochemical industry. In aggregates of this kind, high-purity refractory products are routinely required so as not to contaminate the substances treated in the aggregates due to impurities or ancillary constituents of the refractory insulating materials. In particular, impurities in the form of iron oxides are generally undesired. In particular, since the raw material according to the invention, as discussed previously, can be provided with extremely low proportions of $Fe_2O_3$, the product according to the invention produced on the basis of the raw material according to the invention is also particularly advantageous for high-refractory insulating uses of this kind in aggregates for the chemical and petrochemical industry. The product according to the invention can particularly advantageously be used for the insulation of aggregates for the chemical and petrochemical industry in the form of sulphur recovery plants (in particular in the form of what are known as Claus combustion chambers and Claus reactors in the Claus process) and in the form of secondary reformers (in the case of ammonia synthesis). The invention also relates to the above-mentioned aggregates insulated with the product according to the invention.

The raw material according to the invention is present in the form of a synthetic raw material, that is to say in the form of a raw material which is not present naturally, but instead is produced as the result of a technical process. The raw material according to the invention is preferably present in the form of a sintered product, that is to say in the form of a product of particles or raw materials sintered together.

In order to produce the raw material according to the invention a batch formed of a plurality of raw materials can be exposed to temperature or firing (sintering), in such a way that these raw materials are sintered together and form the raw material according to the invention. Here, the raw materials are present in a batch of this kind in such a way that, after the sintering, a product having the chemical composition of the raw material according to the invention is provided.

In order to produce the high open porosity of the raw material according to the invention, at least one of the few following processes known from the prior art for producing porosity in a raw material can preferably be applied: a burn-out process or a gas-forming process.

In a burn-out process the batch for producing the raw material according to the invention comprises at least one raw material, which burns out during production of the raw material according to the invention. This burn-out can occur in particular with a sintering for production of the raw material according to the invention. The principle of the production of porosity with a burn-out of this kind lies in the fact that the space occupied by the burn-out of the raw material leaves behind a cavity after the burn-out, which cavity is in the form of a pore volume.

In the case of a gas-forming process the batch for producing the raw material according to the invention comprises at least one raw material, which forms gas during the production of the raw material according to the invention. This gas produces cavities which are then present in the form of pores in the produced raw material.

The batch used for production of the raw material according to the invention comprises mineral raw materials which comprise the oxides $Al_2O_3$, MgO and CaO. Since the raw material according to the invention preferably consists predominantly or also practically exclusively of the oxides $Al_2O_3$, MgO and CaO, raw materials that are as pure as possible, that is to say raw materials having a minimal proportion of ancillary constituents, are preferably used for production of the raw material according to the invention.

In order to provide the proportion of $Al_2O_3$ in the raw material according to the invention, a raw material based on $Al_2O_3$ is used in the batch which is used for processing the raw material according to the invention, preferably at least one of the following raw materials: sintered corundum, fused corundum or calcined alumina, is used in the batch used to produce the raw material according to the invention. Calcined alumina is preferably used. High-purity calcined alumina is particularly preferably used, preferably with a proportion of at least 98 mass % $Al_2O_3$, even more preferably at least 99 mass % $Al_2O_3$, in relation to the total mass of the calcined alumina.

In order to provide the proportion of CaO in the raw material according to the invention, at least one of the following raw materials is preferably used for production of the raw material according to the invention: limestone ($CaCO_3$) or dolomite ($CaCO_3 \cdot MgCO_3$). The use of limestone or dolomite in the batch for producing the raw material according to the invention in particular also has the advantage that these raw materials calcine during the sintering, and the resultant gaseous $CO_2$ produces a porosity in the raw material. In this regard, there is a gas formation as described previously, by means of which the high open porosity can be produced in the raw material according to the invention. Limestone and dolomite of raw purity are preferably used.

A limestone is preferably used which (after its calcination, that is to say without the cleaved $CO_2$) comprises a proportion of CaO of at least 98 mass %, even more preferably at least 99 mass %, in relation to the total mass of limestone. Accordingly, a dolomite can preferably be provided which (again after its calcination) comprises a total mass of CaO and MgO of at least 95 mass %, even more preferably at least 97 mass %, in relation to the total mass of dolomite. The batch for producing the raw material according to the invention particularly preferably comprises limestone in order to provide the proportion of CaO in the raw material according to the invention.

In order to provide the proportion of MgO in the raw material according to the invention, the batch used for production of the raw material according to the invention preferably comprises at least one of the following raw materials: magnesia or dolomite. Here, as described previously, the dolomite can contribute at the same time to the gas formation and in addition can be formed as above. Magnesia (MgO) can preferably be present in the form of at least one of the following raw materials in the batch: fused magnesia, sintered magnesia or caustic magnesia. A magnesia with a high purity is again particularly preferably used, particularly preferably having a proportion of MgO of at least 97 mass %, even more preferably of at least 98 mass %, in relation to the total mass of the raw material.

Caustic magnesia is particularly preferably used in the batch for producing the raw material according to the invention in order to provide the proportion of MgO in the raw material according to the invention.

The batch for producing the raw material according to the invention particularly preferably comprises the three mineral raw materials calcined alumina, limestone and caustic magnesia. Here, the batch can preferably comprise a proportion of calcined alumina in the range of from 80 to 88 mass %, a proportion of limestone in the range of from 8 to 15 mass %, and a proportion of caustic magnesia in the range of from 2 to 8%, in each case in relation to the total mass of the mineral raw materials in the batch (that is to say in particular without consideration of organic constituents, temporary binders and constituents that can be burnt out, as described hereinafter).

Besides the above-mentioned mineral raw materials, the batch for producing the raw material according to the invention preferably also comprises at least one of the following raw materials: a raw material that can be burnt out or a raw material that forms gas during the production of the raw material according to the invention.

A raw material in the batch of this kind that can be burnt out, as described beforehand, can be a raw material by means of which porosity is produced in the raw material by means of the burn-out of said raw material during the production process. Said material can preferably be at least one organic raw material that can be burnt out, particularly preferably at least one of the following raw materials: wood dust, wood flour, wood chips, methyl cellulose, carbon black, cellulose, dextrin or coconut shell flour. The total mass of these raw materials that can be burnt out preferably lies in a proportion in the range of from 1 to 30 mass %, particularly preferably in a proportion of from 1 to 10 mass %, in relation to the total mass of mineral raw materials and these components that can be burnt out in the batch.

For production of the porosity by gas formation, the batch, as described previously, can comprise in particular a raw material that calcines during the sintering, such that gaseous carbon dioxide ($CO_2$) is formed by the calcination. A gas-forming raw material of this kind, as described previously, is particularly preferably present in the form of limestone. A raw material of this kind in the form of limestone in particular also has the advantage that it on the one hand constitutes a raw material source for the proportion of CaO in the raw material according to the invention and on the other hand at the same time constitutes a source for the production of gaseous $CO_2$ during the firing of the batch to form the raw material according to the invention.

The batch for producing the raw material according to the invention is particularly preferably present in very fine-grained form, that is to say in a very small particle size. In accordance with a particularly preferred embodiment the particle size of the batch has a $d_{90}$ value less than 50 μm. In this regard, the batch for producing the raw material according to the invention is preferably present in a particle size less than 50 μm to an extent of at least 90 mass %, in relation to the total mass of the batch. The particle size is determined by means of laser diffraction in accordance with ISO 13320: 2009-10.

Besides the above-mentioned mineral raw materials and the raw materials that can be burnt out, the batch for producing the raw material according to the invention preferably also comprises a binder, preferably a temporary binder, that is to say a binder that burns out during the sintering.

The batch preferably comprises a temporary binder of this kind in the form of an organic binder. In accordance with one embodiment the batch comprises an aqueous organic binder, that is to say a binder in the form of an organic substance dissolved in water. In accordance with a particularly preferred embodiment the batch comprises a binder in the form of polyvinyl alcohol dissolved in water. The batch can comprise the binder preferably in a proportion in the range of from 1.5 to 5 mass %, particularly preferably in a proportion of approximately 3 mass %, in each case in relation to the batch without the binder.

The batch, in particular mixed with a binder, can preferably be mixed in a mixer. In accordance with one embodiment the mixed batch is then shaped into shaped pieces, for example by pressing. In accordance with a particularly preferred embodiment, however, the mixed batch is either granulated into granules during the mixing or is granulated into granules in a granulation process downstream of the mixing. Such granules preferably have a mean particle size in the range of from 1 to 5 mm.

The mixed batch, which is then either pressed into shaped pieces or is granulated, is then subjected to sintering. Before sintering, the pressed or granulated batch can be dried, for example in a drying device. The batch is preferably exposed to sintering at a temperature in the range of from 1,600° C. to 1,650° C., preferably for a period of approximately one hour. During the sintering, the organic raw materials of the batch burn out and calcinable mineral components of the batch, in particular limestone, calcine with release of gaseous $CO_2$. As a result of this burn-out and this gas formation, porosity is produced during the sintering, such that a raw material according to the invention in the form of a sintered product having a high porosity according to the invention is present following the cooling of the fired batch.

Alternatively to the previously described production of the raw material according to the invention by sintering, the raw material according to the invention can also be produced by the blowing of a melt to form hollow spheres, corresponding to the known technique used for the production of hollow sphere corundum. In this case a batch formed of a number of raw materials of which the overall chemical composition corresponds to the chemical composition of the raw material according to the invention is preferably melted to form a melt, and this melt is then blown to form hollow spheres. This technique, however, is less preferred than the production of the raw material according to the invention by sintering, since the production of hollow spheres is technically very complex and also of less interest economically due to the high energy consumption.

Further features of the invention will become clear from the claims and the practical example described hereinafter.

All of the features of the invention can be combined with one another arbitrarily, individually or in combination.

A method for producing an exemplary embodiment of a raw material according to the invention and the raw material obtained thereby will be described in the following practical example.

A batch is first provided for producing the exemplary embodiment of a raw material according to the invention.

The batch comprises the following proportions of mineral raw materials, in relation to the total mass of these raw materials:

calcined alumina: 87 mass %
limestone: 13 mass %
caustic magnesia: 5 mass %

The calcined alumina comprises a proportion of $Al_2O_3$ of 99.7 mass % and a proportion of $Na_2O$ of approximately 0.3 mass %, in each case in relation to the total mass of the calcined alumina.

The limestone comprises a proportion of CaO of 98.4 mass %, of $SiO_2$ of 1.0 mass %, of $Al_2O_3$ of 0.4 mass %, and of $Fe_2O_3$ of 0.2 mass %, in each case in relation to the total mass of the calcined limestone.

The caustic magnesia comprises a proportion of MgO of 98 mass %, of CaO of 1.6 mass %, of $SiO_2$ of 0.3 mass %, and of $Fe_2O_3$ of 0.1 mass %, in each case in relation to the total mass of the caustic magnesia.

These mineral raw materials were mixed with one another and ground to a particle size $d_{90}$ less than 50 μm.

This finely ground mixture of the mineral raw materials was then mixed with 5 mass % wood dust, in relation to the total mass of mineral raw materials and wood dust. This batch formed of mineral raw materials and wood dust was also mixed with 30 mass % of a temporary liquid binder, in relation to the total mass of mineral raw materials and wood dust without the temporary binder. The temporary binder was formed from 93 mass % water and 7 mass % polyvinyl alcohol, in relation to the total mass of the binder. This batch formed of mineral raw materials, wood dust and temporary binder was mixed in a mixer and then granulated into granules having a mean particle size in the range of from 1 to 5 mm. These granules were then fired for an hour at a temperature of 1,600° C. in a furnace. In so doing, the temporary binder liquefied. The wood dust burnt out completely and left behind a high porosity, which was not closed again during the further sintering. The limestone also calcined, wherein the resulting gaseous $CO_2$ created porosity. The particles of the mineral raw materials sintered with one another during the firing.

Once the sintering had been performed, the granules were left to cool. These granules were then present in the form of a raw material according to the invention. In this regard, this raw material according to the invention was present in the form of grains formed of particles sintered with one another, wherein the grains had a high open porosity, such that the raw material was present in the form of lightweight raw material.

The high open porosity was formed on the one hand by the burnout of the wood dust and on the other hand by the calcination of the limestone during the sintering.

The obtained raw material was analysed in respect of its chemical composition in accordance with DIN EN ISO 12677:2013-02. The raw material then had a chemical composition in accordance with which the following oxides were each present in the raw material in the following proportions, in each case in relation to the total mass of the substances determined in accordance with the chemical analysis:

$Al_2O_3$: 86.59 mass %,
MgO: 5.36 mass %,
CaO: 7.57 mass %,
$SiO_2$: 0.13 mass %,
$Fe_2O_3$: 0.13 mass %,
$Na_2O$: 0.14 mass %,
loss on ignition: 0.26 mass %.

The open porosity of the raw material determined in accordance with DIN 66133:1993-06 was 34.6 vol. %.

The raw density of the raw material was determined in accordance with DIN EN 993-1:1995-04 at 2.376 g/cm³.

The bulk weight according to DIN EN ISO 60:2000-01 was 770 g/l.

The pore size distribution in the obtained raw material was also determined by means of mercury intrusion porosimetry in accordance with DIN 66133:1993-06. The $d_{90}$ value for the pore size was 48 µm.

Lastly, the type and proportion of the mineralogical phases in the raw material were determined by means of X-ray diffractometry according to DIN EN 13925-1:2003-07. The following phases were able to be determined in the following proportions, in each case in relation to the total mass of the raw material:

$Ca_2Mg_2Al_{28}O_{46}$: 42 mass %
$CaMg_2Al_{16}O_{27}$: 45 mass %
$MgAl_2O_4$ (spinel): 3 mass %
$CaAl_4O_7$ (grossite): 5 mass %
$CaAl_{12}O_{19}$ (hibonite): 5 mass %

The fire resistance of the raw material was also tested, in particular its shrinkage and dimensional stability at high temperatures. Here, practically no shrinkage, and thus a high dimensional stability of the obtained raw material could be determined, even at temperatures up to 1,700° C.

With use of the raw material obtained in accordance with this practical example, a refractory product in the form of a refractory concrete was produced. To this end, 55 mass % of the raw material obtained in accordance with the practical example, 25 mass % of a calcium-aluminate cement, and 20 mass % alumina (consisting of calcined alumina and sintered alumina) were firstly mixed with one another with addition of water to form a mixture. The values in mass % relate to the mixture without water.

The cement was then left to set, and the set mixture was fired at 1,650° C. to form a refractory product in the form of a refractory concrete.

This product had a density of only 1.75 g/cm³, an open porosity of 47 volume %, and hereby a high insulating value. In spite of this low density and high open porosity, the product had only a linear shrinkage of 2% at 1,700° C.

The obtained raw material is therefore outstandingly suitable for the production of a refractory product having a high insulating value and at the same time a high potential use temperature.

The invention claimed is:

1. A raw material for producing a refractory product, comprising the following features:
    1.1 the raw material has a chemical composition according to which the following oxides are present in the following proportions:
        $Al_2O_3$: 83 to 93 mass %,
        MgO: 4 to 9 mass %,
        CaO: 5 to 8 mass %;
    1.2 the raw material has an open porosity in the range of from 30 to 60 volume %; and
    1.3 wherein the raw material is produced from a batch, a particle size of the batch having a $d_{90}$ value less than 50 µm.

2. The raw material according to claim 1, which has a chemical composition according to which the oxides $Al_2O_3$, MgO and CaO are present in a total proportion of at least 98 mass % in relation to the total mass of the substances of the chemical composition of the raw material.

3. The raw material according to claim 1, which has a chemical composition with a proportion of $SiO_2$ less than 0.5 mass %.

4. The raw material according to claim 1, which has a chemical composition with a proportion of $Fe_2O_3$ less than 0.5 mass %.

5. The raw material according to claim 1, which has a raw density in the range of from 1.60 to 2.50 g/cm³.

6. The raw material according to claim 1, which has a bulk weight in the range of from 600 to 1,000 g/l.

7. The raw material according to claim 1, which has a pore size distribution on the basis of which at least 90 vol. % of the pore volume of the open pores are formed by pores with a pore size less than 50 µm.

8. The raw material according to claim 1, which comprises the phase $Ca_2Mg_2Al_{28}O_{46}$.

9. The raw material according to claim 1, which comprises the phase $CaMg_2Al_{16}O_{27}$.

10. The raw material according to claim 1, which comprises the phase $MgAl_2O_4$ in a proportion less than 8 mass %.

11. A method for producing a refractory product comprising:
    producing the refractory product through use of a raw material, wherein the raw material comprises:
        a chemical composition according to which the following oxides are present in the following proportions:
            $Al_2O_3$: 83 to 93 mass %,
            MgO: 4 to 9 mass %, and
            Ca0: 5 to 8 mass %; and
        an open porosity in the range of from 30 to 60 volume %; and
    wherein the raw material is produced from a batch, a particle size of the batch having a $d_{90}$ value less than 50 µm.

12. A refractory product which comprises:
    a raw material, wherein the raw material comprises:
        a chemical composition according to which the following oxides are present in the following proportions:
            $Al_2O_3$: 83 to 93 mass %,
            MgO: 4 to 9 mass %, and
            CaO: 5 to 8 mass %; and
        an open porosity in the range of from 30 to 60 volume %; and
    wherein the raw material is produced from a batch, a particle size of the batch having a $d_{90}$ value less than 50 µm.

13. The refractory product according to claim 12 in the form of a refractory concrete.

14. The refractory product according to claim 12, which comprises a calcium-aluminate cement in addition to the raw material.

15. The refractory product according to claim 12, wherein a proportion of the raw material in the refractory product is 10 to 90 mass %.

* * * * *